(12) United States Patent
Ysebaert et al.

(10) Patent No.: US 9,455,800 B2
(45) Date of Patent: Sep. 27, 2016

(54) DEVICE AND METHOD FOR MITIGATING EFFECTS OF IMPULSE NOISE ON DATA PACKET TRANSFER

(75) Inventors: Geert Bert Maarten Ysebaert, Winksele (BE); Katleen Peggie Florimond Van Acker, Berchem (BE); Piet Michel Albert Vandaele, Sint-Amandsberg (BE)

(73) Assignee: Alcatel Lucent, Boulogne-Billancourt (FR)

( * ) Notice: Subject to any disclaimer, the term of this patent is extended or adjusted under 35 U.S.C. 154(b) by 2219 days.

(21) Appl. No.: 11/624,958

(22) Filed: Jan. 19, 2007

(65) Prior Publication Data

US 2007/0198898 A1 Aug. 23, 2007

(30) Foreign Application Priority Data

Feb. 7, 2006 (EP) .................................... 06290224

(51) Int. Cl.
*H04L 1/08* (2006.01)
*H04L 1/18* (2006.01)
*H04L 1/00* (2006.01)

(52) U.S. Cl.
CPC .............. *H04L 1/08* (2013.01); *H04L 1/0057* (2013.01); *H04L 1/0071* (2013.01); *H04L 1/1806* (2013.01); *H04L 1/1825* (2013.01); *H04L 1/1887* (2013.01); *H04L 1/0009* (2013.01)

(58) Field of Classification Search
CPC ...... H04L 1/08; H04L 1/1806; H04L 1/1825
USPC ....................................................... 714/751
See application file for complete search history.

(56) References Cited

U.S. PATENT DOCUMENTS

| | | | | |
|---|---|---|---|---|
| 3,536,840 | A * | 10/1970 | Sullivan ........................ | 714/799 |
| 4,730,313 | A * | 3/1988 | Stephenson et al. ......... | 714/708 |
| 4,747,104 | A * | 5/1988 | Piret .............................. | 714/761 |
| 5,640,415 | A * | 6/1997 | Pandula ........................ | 375/133 |
| 5,699,365 | A * | 12/1997 | Klayman et al. ............. | 714/708 |
| 5,768,527 | A * | 6/1998 | Zhu et al. ..................... | 709/231 |
| 5,995,239 | A * | 11/1999 | Kagawa et al. .............. | 358/405 |
| 6,085,252 | A * | 7/2000 | Zhu et al. ..................... | 709/231 |
| 6,088,342 | A * | 7/2000 | Cheng et al. ................. | 370/320 |
| 6,247,150 | B1 * | 6/2001 | Niemela ........................ | 714/701 |
| 6,282,683 | B1 * | 8/2001 | Dapper et al. ................ | 714/746 |

(Continued)

FOREIGN PATENT DOCUMENTS

| | | | | |
|---|---|---|---|---|
| JP | 2004241826 A | * | 8/2004 | ............ H04L 12/56 |
| WO | WO 2005/086405 A2 | | 9/2005 | |

OTHER PUBLICATIONS

A. Tannenbaum, "Computer Networks", Computer Networks, London, GB, 1996, pp. 202-219, XP002155806.

(Continued)

*Primary Examiner* — Joseph D Torres
(74) *Attorney, Agent, or Firm* — Harness, Dickey & Pierce, P.L.C.

(57) ABSTRACT

A device for mitigating effects of impulse noise on data packet transfer over a communication line is configured at least partially according to physical layer characteristics of the communication line. As an example, a data packet retransmission device might be configured to retransmit in response to each retransmission request an amount of data packets depending on the physical layer interleaving delay ID and/or data bit rate DBR.

17 Claims, 1 Drawing Sheet

(56) References Cited

U.S. PATENT DOCUMENTS

| | | | |
|---|---|---|---|
| 6,317,418 B1* | 11/2001 | Raitola et al. | 370/278 |
| 6,631,127 B1* | 10/2003 | Ahmed et al. | 370/349 |
| 6,711,180 B1* | 3/2004 | Delesalle et al. | 370/474 |
| 6,738,370 B2* | 5/2004 | Ostman | 370/349 |
| 6,782,490 B2* | 8/2004 | Maxemchuk et al. | 714/18 |
| 6,895,057 B1* | 5/2005 | Balachandran et al. | 375/259 |
| 6,920,598 B2* | 7/2005 | Chen et al. | 714/748 |
| 6,975,599 B1* | 12/2005 | Johnson et al. | 370/278 |
| 6,999,432 B2* | 2/2006 | Zhang et al. | 370/328 |
| 7,046,642 B1* | 5/2006 | Cheng et al. | 370/320 |
| 7,068,619 B2* | 6/2006 | Balachandran et al. | 370/328 |
| 7,069,490 B2* | 6/2006 | Niu et al. | 714/748 |
| 7,093,178 B2* | 8/2006 | Kim et al. | 714/748 |
| 7,155,655 B2* | 12/2006 | Cheng | 714/748 |
| 7,164,654 B2* | 1/2007 | Hunzinger et al. | 370/230 |
| 7,174,493 B2* | 2/2007 | Matsumoto et al. | 714/748 |
| 7,355,976 B2* | 4/2008 | Ho et al. | 370/235 |
| 7,362,733 B2* | 4/2008 | Kim et al. | 370/335 |
| 7,400,687 B2* | 7/2008 | Matsumoto et al. | 375/260 |
| 7,447,967 B2* | 11/2008 | Onggosanusi et al. | 714/748 |
| 7,471,693 B2* | 12/2008 | Petrovic et al. | 370/444 |
| 7,573,852 B2* | 8/2009 | Kim et al. | 370/335 |
| 7,580,427 B2* | 8/2009 | Yun et al. | 370/477 |
| 7,590,889 B1* | 9/2009 | Maxemchuk et al. | 714/18 |
| 7,620,847 B1* | 11/2009 | Maxemchuk et al. | 714/18 |
| 7,631,247 B2* | 12/2009 | Petrovic et al. | 714/776 |
| 7,653,141 B2* | 1/2010 | Mo et al. | 375/260 |
| 7,676,731 B2* | 3/2010 | Moon et al. | 714/774 |
| 7,676,732 B2* | 3/2010 | Moon et al. | 714/774 |
| 7,684,329 B2* | 3/2010 | Mohanty et al. | 370/232 |
| 7,698,616 B2* | 4/2010 | Onggosanusi et al. | 714/748 |
| 7,839,940 B2* | 11/2010 | Borran et al. | 375/260 |
| 7,969,957 B2* | 6/2011 | Naka et al. | 370/343 |
| 2002/0001287 A1* | 1/2002 | Bergenwall et al. | 370/230 |
| 2002/0019232 A1* | 2/2002 | Balachandran et al. | 455/445 |
| 2002/0069388 A1 | 6/2002 | Niu | |
| 2002/0172294 A1* | 11/2002 | Cheng | 375/281 |
| 2003/0039229 A1 | 2/2003 | Ostman | |
| 2003/0131303 A1* | 7/2003 | Kim et al. | 714/755 |
| 2005/0175024 A1* | 8/2005 | Ho et al. | 370/412 |
| 2006/0062164 A1* | 3/2006 | Jung et al. | 370/278 |
| 2006/0092972 A1* | 5/2006 | Petrovic et al. | 370/469 |
| 2006/0092973 A1* | 5/2006 | Petrovic et al. | 370/469 |
| 2007/0032198 A1* | 2/2007 | Sakamoto | 455/69 |

OTHER PUBLICATIONS

J. Rosenberg et al, "An RTP payload Format for Generic Forward Error Correction", IETF RFC 2733, Dec. 1999, pp. 1-22.

"Transmission of Professional MPEG-2 Transport Streams Over IP Networks", PRO-MPEG Code of Practice #3 release 2, Jul. 2004—pp. 1-17.

* cited by examiner

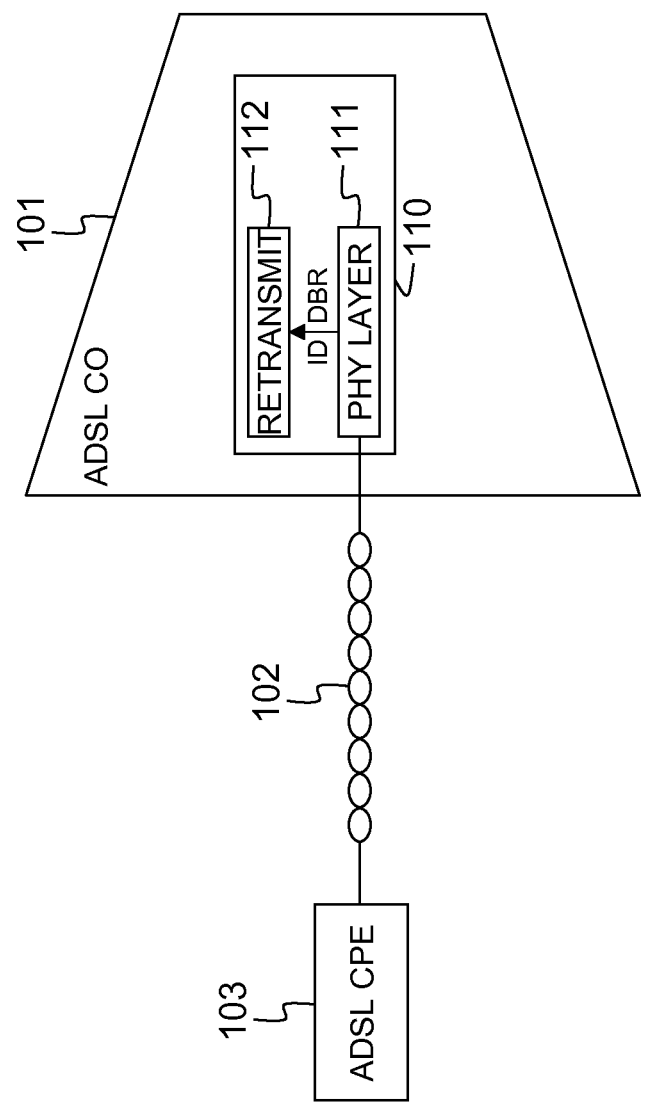

DEVICE AND METHOD FOR MITIGATING EFFECTS OF IMPULSE NOISE ON DATA PACKET TRANSFER

FIELD OF THE INVENTION

The present invention generally relates to mitigating the effects of impulse noise on data packet transfer over a communication line. Impulse noise is noise of short duration, usually but not necessarily affecting a broad frequency range on the communication line. It is typically the result of a short duration disturbance or event in the neighbourhood of the communication line, like for instance the passing by of a tram or train if the communication line is deployed near a railroad, or changes in home appliances like the switching on/off of lighting, dimmers, refrigerators, washing machines, dryers, elevators, etc. Changes in such appliances typically induce noise bursts ranging from a few hundreds of microseconds up to a few seconds in the frequency spectrum used for data packet transfer in for instance inhouse or access networks. Impulse noise can ripple through the protocol stack and eventually affect higher layers from the data link layer up to the application layer. As a consequence, uncorrected impulse noise can lead to data packet corruption, i.e. loss or affection of data packets, that reduces the end user's quality of experience. In case of video deployment for instance, impulse noise that remains uncorrected at the physical or higher layers may result in visual artefacts for the viewer. Stability problems resulting from impulse noise are expected to increase in the future, in particular on lines that are deployed near the edge of performance like for instance twisted copper pairs used in a DSL (Digital Subscriber Line) network. As network operators are willing to upgrade such communication lines to offer higher bit rates to enable triple play services, mitigation of the effects of impulse noise will be one of the main challenges.

It is noted that "communication line" in the context of the current patent application should be interpreted broadly to cover any wireline or wireless transmission medium used for data packet transfer. Examples are a Digital Subscriber Line like an ADSL line (Asymmetric Digital Subscriber Line) or VDSL line (Very High Speed Digital Subscriber Line), a coax cable or optical fibre deployed in transmission, access or inhouse networks, a wireless link like a GPRS link (General Packet Radio Services), a UMTS link (Universal Mobile Telecommunications System), an inhouse wireless LAN connection, etc. "Data packet" in the context of the current patent application means any fixed length or variable length group of data bytes or bits that is transferred as a single entity. In other words, it also covers data frames, data cells, data words, data symbols, data segments, etc. An example is a video packet containing 1500 consecutive bytes of a video stream that is transferred over the communication line.

BACKGROUND OF THE INVENTION

Existing mechanisms to mitigate packet loss due to impulse noise can be categorized as either retransmission mechanisms or forward error correction (FEC) mechanisms.

Retransmission mechanisms consist in repairing corrupted data packets by re-sending the data packets for which a retransmission request has been received. The retransmission request can be issued by the receiver that has received an irrecoverably affected data packet (such implementations are often referred to as ARQ or Automatic Repeat Request mechanisms) or alternatively can be issued by a timer waiting for the receiver to acknowledge the reception of a data packet but not receiving such acknowledgement within a predefined time from the sending of that data packet. Combinations of both, i.e. retransmission requests from the receiver for irrecoverably damaged packets and retransmission requests from a timer in or near the transmitter for unacknowledged or lost data packets, are described in literature as well.

Retransmission is typically done at the higher layers, i.e. the protocol stack layers above the physical layer such as the TCP layer or Transmission Control Protocol layer.

Retransmission has also been suggested for the physical layer, for instance in the ETSI SDSL standard contribution 054t34 from France Telecom entitled "Impulse Noise Correction in SDSL Using Retransmission Request". In this standard contribution, it is proposed to implement at the PMD (Physical Medium Dependent) layer of an SDSL (Symmetric Digital Subscriber Line) system to record recently transmitted data segments in the SDSL transmitter. The SDSL receiver can request retransmission of a data segment that was corrupted through the occurrence of impulse noise on the copper pair by indicating the segment number of the data segment to be re-sent. The SDSL transmitter receiving a retransmission request, handles the request in priority.

Yet another implementation of retransmission is a dual layer retransmission scheme as disclosed in U.S. Pat. No. 6,931,569. Herein, the link layer of the receiver and the physical layer of the transmitter include enhancements that interact with each other for error recovery. The receiving link layer detecting lost or affected data packets sends a retransmission request towards the transmitting physical layer in order to initiate retransmission of the corrupted packet(s).

Other retransmission schemes can be found in A. S. Tanenbaum, "Computer Networks", Fourth Ed., 2003, more particularly in section 3.3 and 3.4 thereof.

Existing retransmission mechanisms are inefficient on communication links with a high loss (due to the bandwidth expansion inherent to retransmission), a high delay (due to the latency inherent to retransmission). The known retransmission mechanisms are medium independent, meaning they are configured to operate equally on each line, irrespective of the physical conditions and/or physical configuration of the line.

Forward error correction (FEC) mechanisms are based on the calculation of a FEC code, i.e. an amount of redundant bits or bytes that are added to each data packet and can be used in the receiver's decoder to recover a limited number of transmission errors such as errors due to impulse noise. Popular FEC mechanisms are for instance Reed-Solomon encoding, Parity-Based encoding, Harris Ascent encoding, . . . . An overview of some FEC mechanisms and their efficiency to mitigate the effects of packet loss in particular for broadcast or multicast applications is given in the publication "Mitigating Packet Loss in IP Audio, Multicast Transmission" from author Jeffrey S. Pattavina. This publication can be found at the Internet via the URL:

http://www.commsdesign.com/showArticle.jhtml?articleID=18901393

FEC mechanisms are usually implemented at the physical layer and are often combined with interleaving. By interleaving at the transmitter and de-interleaving at the receiver data bytes of consecutive FEC codewords, the effect of short duration noise or impulse noise is spread over several FEC codewords, improving the chances that the receiving decoder will be able to recover the errors induced by the impulse noise. Reed-Solomon FEC and interleaving are for instance used on ADSL (Asymmetric Digital Subscriber Line) loops. The combined configuration of the physical layer FEC encoder/decoder and interleaver/de-interleaver determines the amount of impulse noise protection or INP for a communication line. This impulse noise protection or INP can be seen as the maximum length of an impulse noise burst against which the line is protected through FEC and interleaving. Independently of the INP, also the maximum delay that can be consumed by the DSL link can be configured. Both the minimum INP and the maximum delay requirements determine the coding and interleaving parameters. An ADSL line may for instance be configured at its physical layer to have a minimum INP of 2 DMT (Discrete Multi Tone) symbols with a maximum delay of 16 milliseconds.

Retransmission techniques at higher layers may be combined with FEC techniques at the physical layer in order to mitigate the effect of impulse noise bursts that exceed the INP in length. A synergy between the two mechanisms with FEC being used to repair single packet losses and retransmission being used as an additional recovery mechanism is for instance suggested in paragraph 4.1 of RFC 2354 "Options for Repair of Streaming Media", published at the IETF website and downloadable from the Internet via the URL:

http://www.ietf.org/rfc/rfc2354.txt?number=2354

When an impulse noise burst exceeds the INP on a line that is protected through a FEC mechanism, a large burst of errors will occur, typically affecting several data packets. Such an error burst will introduce a correlated data packet corruption at the higher layers, i.e. multiple consecutive data packets are lost or affected at a time. As an example, an ADSL line can be considered whose physical layer interleaving function is configured to introduce an interleaving delay of 16 milliseconds. When the impulse noise protection is exceeded, an error burst of at least 16 milliseconds will occur because the interleaving function spreads consecutive corrupted bytes at least 16 milliseconds. If the ADSL line is used to convey video packets that have a length of 1500 bytes, and the downstream bit rate on the ADSL line is assumed to be 4 Mbps (megabit per second), then the number of consecutive video packets that will be corrupted is at least:

$$\text{ceil}[16 \cdot 10^{-3} \text{s} \times 4 \cdot 10^{6} \text{ bits/s}/(1500 \times 8 \text{ bits/packet})] = 6 \text{ packets}$$

Thus, the configuration at the physical layer determines the burstiness of the data packet corruption. Traditional, state-of-the-art retransmission mechanisms can be combined with FEC and interleaving techniques, but they are physical media independent. In other words, such re-transmission techniques are configured equally for all lines and do not take into account differences between the lines such as the burstiness of the data corruption.

Lastly, it is acknowledged that it is known to apply FEC mechanisms at higher layers, such as e.g. the RTP (Real-Time Protocol) layer, for protection against error bursts at a lower layer. Such higher layer FEC mechanisms are also configured media independently, i.e. without taking into account physical layer differences between different lines. Such FEC mechanism can be found in IETF RFC 2733 from J. Rosenberg et al., entitled "An RTP Payload Format for Generic Forward Error Correction". This RFC from December 1999 can be found on the Internet via URL:

http://www.ietf.org/rfc/rfc2733.txt?number=2733

Another publication wherein such a FEC mechanism can be found is the Pro-MPEG Forum article "Transmission of Professional MPEG-2 Transport Streams over IP Networks", downloadable via the following URL:

http://62.73.167.57/publications/pdf/Vid-on-IP-CoP3-r2.pdf

Also proprietary FEC codes exist, e.g. the so-called Raptor codes which are explained at Digital Fountain's website in "DF Raptor FEC Technology" at URL:

http://www.digitalfountain.com/technology/index.cfm

It is an object of the present patent application to disclose a device and method for mitigating effects of impulse noise on data packet transfer over a communication line, but which overcomes the above described drawbacks of existing impulse noise mitigating techniques, or combinations of such techniques.

SUMMARY OF THE INVENTION

According to the present invention, the just defined object is realized through a device for mitigating effects of impulse noise on data packet transfer over a communication line, the device being configured at least partially according to physical layer characteristics of the communication line. Such a device is defined in claim 1.

Indeed, the integrity of data packets transferred from one end to another is better guaranteed when the impulse noise mitigating technique is configured according to the physical layer characteristics of the line. This way, the impulse noise mitigation technique, e.g. the retransmission mechanism or the FEC mechanism, might differ from line to line depending for instance on the bit rate, latency, number of DMT symbols per FEC codeword, interleaving depth, etc., hence compensating for the inherent differences between the physical layer characteristics of the different lines.

When the operator has different configurations per line, the retransmission mechanism or FEC mechanism according to the present invention could even be configured networkwide by taking into account the worst-case line conditions, e.g. the worst-case delay on a DSL link.

The present invention further relates to a physical layer agent as defined in claim 12 and a method for mitigating effects of impulse noise on data packet transfer over a communication line as defined in claim 13.

An optional feature of the device according to the present invention, defined by claim 2, is that the device is a data packet retransmission device comprising:

a. means for memorizing recently transmitted data packets;

b. means for receiving a retransmission request for a corrupted data packet;

c. means for generating time-outs; and d. means for retransmitting at least the corrupted data packet.

Indeed, one possible instance of the device for mitigating the effects of impulse noise according to the current invention is a retransmission device, operating on the basis of retransmission requests coming from the receiver and/or a timer that generates time-outs when no acknowledgements or retransmission requests are received. As will be explained below, alternative implementations exist, such as forward error correction devices.

It is noted that the retransmission request might be received from the receiver having received a corrupted data packet, or alternatively might be received from a timer in or near the transmitter that waits for acknowledgements from the receiver.

A further optional feature of the device according to the current invention is that it may be configured to retransmit in response to each retransmission request an amount of data packets dependent on the physical layer interleaving delay ID of said communication line. This optional feature is defined by claim 3.

As already explained above, the physical layer interleaving delay determines the burstiness of packet loss, hence the number of consecutive data packets that will be corrupted through an impulse noise burst that exceeds the impulse noise protection INP. Consequently, a device that automatically retransmits an amount of data packets corresponding for instance to the minimum amount of data packets that will be corrupted by the impulse noise burst takes benefit of the physical layer characteristics to improve the efficiency of the retransmission mechanism.

An alternative or other optional feature could be to consider the histogram of the impulse noise duration. If the interleaving delay is too low, the impulse noise burst might be longer than the interleaving delay. Hence if statistics of the interleaving delay are available, the burstiness will be determined by max (interleaving delay, impulse noise burst length). However, a histogram of the impulse noise duration is not always available.

Yet another optional feature of the device according to the present invention is that it may be configured to retransmit in response to each retransmission request an amount of data packets dependent on the physical layer data bit rate DBR of the communication line. This optional feature is defined by claim 4.

This feature builds on the insight that the number of data packets that will be corrupted through an impulse noise burst of certain duration will be proportional to the data bit rate on the communication line (at least when it is assumed that all data packets have the same length). Hence configuring the retransmission to automatically retransmit more data packets on a line with a higher data bit rate will operate more efficiently than the traditional physical media-independent retransmission mechanisms that are configured equally for all lines.

Still an optional feature, defined by claim 5, is that the amount of retransmitted data packets is configured to equal ceil(ID×DBR/DPL), with ID being the interleaving delay, DBR being the data bit rate on the line and DPL being the packet length of the data packets. Note that the ceiling is needed to obtain an integer number of packets.

Alternatively, the amount of retransmitted packets could be configured to equal for instance ceil(ID×VBR/DPL), where VBR is the video bit rate. In situations where the video bit rate is substantially lower than the bit rate on the line, the packets will be spread over time with possibly other traffic in between e.g. coming from high-speed Internet. In this case the video packets are not back-to-back. This means that a lower number of video packets will be hit, assuming in this case that the retransmission is only activated on the video traffic.

Assuming again a fixed data packet length and a physical layer with interleaving function, ID×DBR/DPL shall correspond to the minimum amount of corrupted consecutive data packets in case of an impulse noise burst whose length exceeds the impulse noise protection resulting from FEC and interleaving. Thus, by automatically retransmitting this amount of data packets each time a retransmission request is received, the performance of the line is optimized in terms of latency and bandwidth overhead introduced by the retransmission scheme.

As an alternative to the retransmission device of claim 2, a possible instance of the device for mitigating the effects of impulse noise according to the current invention can be a forward error correction device, as defined by claim 6.

Indeed, in particular a forward error correction device implemented at higher layers, i.e. layers above the physical layer, can be configured according to physical layer characteristics in order to become line dependent and more efficient.

An optional choice for a forward error correction device according to the present invention is that it is configured according to physical layer inter-arrival time statistics for impulse noise measured on the communication line. This optional feature is defined by claim 7.

Indeed, the FEC encoding/decoding may vary from one line to another, depending on the inter-arrival time statistics collected for the impulse noise on the respective lines. It is noticed that in practice, the inter-arrival time statistics will determine the DSL delay to be configured on the line which in turn determines the configuration of the higher layer retransmission or FEC parameters.

Also an optional feature for a forward error correction device according to the present invention is that the amount of retransmitted data packets is configured to equal ID×DBR/DPL, with ID being the interleaving delay, DBR being the data bit rate on the line and DPL being the packet length of the data packets. This feature is defined by claim 8.

As is indicated by claims 9 to 11, a device according to the present invention can be integrated in a chip (such as a digital ASIC), can be integrated in a server (e.g. a retransmission server performing the retransmissions for several lines), can be implemented on a linecard (like for instance an ADSL or VDSL linecard in a DSLAM or Digital Subscriber Access Multiplexer), etc.

BRIEF DESCRIPTION OF THE DRAWING(S)

FIG. 1 illustrates an embodiment of the device for mitigating effects of impulse noise according to the present invention, the embodiment being an instantiation of a retransmission device in an access node.

DETAILED DESCRIPTION OF EMBODIMENT(S)

FIG. 1 shows an ADSL CO (central office) 101 whereto an ADSL CPE (customer premises equipment) 103 is connected via a twisted copper pair 102. The ADSL line is assumed to be used for video transmission. The video packets which are received from a video or TV server deeper in the network and not shown in FIG. 1 are assumed to have a packet length PL of 1500 bytes.

The ADSL physical layer functions, which are typically integrated in a digital ASIC or a DSP on the ADSL linecard in the central office 101, are represented by the functional block 111 in FIG. 1. With respect to the current invention, it is relevant to understand that the video packets which are received at the central office 101, are at the physical layer 111 converted into Reed-Solomon codewords, and these Reed-Solomon codewords are interleaved before being converted in DMT (Discrete Multi Tone) symbols that are transmitted towards the ADSL CPE 103 through the ADSL downstream channel on the line 102. The interleaver in the physical layer 111, which is supposed to operate according to the ADSL standard specifications for interleaving, is configured to introduce an interleaving delay ID of e.g. 16 milliseconds. The data bit rate DBR on the downstream channel from the ADSL CO 101 to the ADSL CPE 103, as determined during the ADSL initialization procedure, is supposed to be e.g. 4 Mbps (megabits per second).

The ADSL line shown in FIG. 1 is further protected for impulse noise through a retransmission mechanism operating at a layer above the physical layer. This retransmission mechanism is functionally represented by block 112 in FIG. 2. By way of example, it is assumed that the retransmission function 112 is integrated in the digital ASIC 110 where also the physical layer function 111 forms part of.

The retransmission function 112 is tuned according to the configuration of the physical layer 111, and more particularly according to the interleaving characteristics—the interleaving depth and number of DMT symbols per RS codeword or delay ID—and additional physical layer characteristics including the data bit rate DBR on the line. Thereto, the physical layer 111 includes an agent that interfaces with the retransmission function 112 at the higher layer and that shares the parameters ID and DBR with the retransmission function 112. The retransmission function 112 includes a timer which indicates that a video packet was corrupted (lost or affected) when a certain time interval has exceeded an no acknowledgement was received from the receiver in the ADSL CPE 103. It is noted that this could also work in the reverse direction where the interleaving delay might be different for up- and downstream. The retransmission function 112 thereupon will select a number of consecutive video packets from its memory that stores recently transmitted video packets, starting with the one packet that was corrupted. The number of consecutive video packets that is selected, is determined by the delay seen on the physical layer and configured to minimally equal:

$$\mathrm{ceil}(ID \times DBR/PL)$$

Under the above assumptions, the number of selected video packets hence minimally equals:

$$\mathrm{ceil}[16.10^{-3} s \times 4.10^6 \text{ bits/s}/(1500 \times 8 \text{ bits/packet})] = 6 \text{ packets}$$

Starting with the video packet that was corrupted, the retransmission function 112 consequently shall automatically re-send 6 consecutive video packets, irrespective of whether these video packets are effectively corrupted.

For other ADSL lines extending from the ADSL CO 101 to different ADSL CPEs via different copper pairs, the physical layer characteristics may be different resulting in a different configuration for the retransmission function on these lines. Depending on the interleaving delay and the actual downstream bit rate on those lines, the number of consecutive packets that will be retransmitted automatically each time a retransmission request is received, may be above or below 6, depending on the physical configuration of that line. Anyhow, since the retransmission function will be configured and tuned to the physical characteristics of the line, the performance of each ADSL line in the presence of impulse noise will be optimized.

A second embodiment, not illustrated by drawings, could be a subscriber line where FEC is used at a higher layer such as the RTP layer, for protection against impulse noise error bursts at lower layers. Physical layer impulse noise information such as the inter-arrival time statistics derived from impulse noise measurements performed on the subscriber line (e.g. by the remote terminal) can be used to configure the RTP FEC function. Also here, the delay will play a role. As a result, the RTP FEC function will differ from subscriber line to subscriber line, optimally taking advantage of the knowledge of physical characteristics of the subscriber line. The Pro-MPEG FEC scheme in one of the publications cited above for instance is a 2 dimensional FEC scheme. This Pro-MPEG FEC scheme is based on parity (XOR) calculations that are made over the columns and the rows of a matrix of RTP packets. The FEC packets corrupted over rows bring resilience to single packet losses while FEC packets computed over columns bring resilience to packet burst losses. According to this invention, the number of rows will have to be determined by the burst length of the lost packets. Hence, this number will depend on the physical layer settings, in a similar way as the retransmission scheme.

It is noticed that the physical layer characteristics like the interleaving delay can be changed at initialization time or during show time. Such online adaptation of the physical layer characteristics according to the current invention may have an impact on the higher layers, e.g. the RTP protocol layer, if the RTP FEC protection function or the retransmission protocol needs to be reconfigured online in a synchronized way for both the transmit and receive ends.

Although the present invention has been illustrated by reference to a specific embodiment illustrated by FIG. 1, it will be apparent to those skilled in the art that various changes and modifications may be made within the spirit and scope of the invention. It is therefore contemplated to cover any and all modifications, variations or equivalents that fall within the spirit and scope of the basic underlying principle disclosed and claimed in this patent application which is to configure the impulse noise mitigation function, i.e. the retransmission function or FEC function at higher layers, according to characteristics of the physical layer. For instance the ADSL context was only given as an example. The skilled person will understand that variant implementations of the current invention can be implemented on non-ADSL loops, e.g. wireline or wireless LAN connections, access subscriber lines, transmission lines, etc. Another rather artificial choice is to have the physical layer function and retransmission function integrated in a single ASIC. More likely is to have the retransmission function form part of a server that serves several lines. Such server can form part of a separate card that contains a retransmission buffer or memory as well as processing power to handle the retransmissions for a plurality of ADSL lines. Alternatively, the retransmission function can be implemented in a distributed server outside the DSLAM or access node. Also, the physical layer parameters, i.e. the interleaving delay ID and the data bit rate DBR, selected to tune the retransmission function described here above, were chosen as examples. Again the skilled person will appreciate that various other physical layer parameters or combinations thereof could serve as input to configure the retransmission function or the FEC function at higher layers. In the case of ADSL for instance, the number of Reed Solomon codewords or the so called s-parameter of the physical layer could be used to configure the retransmission at higher layers. It is also noticed that the retransmission function might be implemented at the physical layer or at a higher layer like the TCP layer. Thus it is possible to proxy the video traffic at the access node, or to communicate the physical layer characteristics or the number of packets to be retransmitted to the TCP sending host, or variant layers like the UDP (User Datagram Protocol) transport layer for UDP based retransmission. Further, it will be apparent to persons skilled in the art of telecom equipment that the functional blocks drawn in FIG. 1 and explained above, can be implemented in software, hardware or a combination of software and hardware.

The invention claimed is:

1. A device for mitigating effects of impulse noise on data packet transfer over a communication line comprising:
a retransmission device configured at least according to physical layer interleaving characteristics of said communication line, the physical layer interleaving characteristics including at least one of a physical layer interleaving delay ID and a physical layer data bit rate DBR, the retransmission device further configured to retransmit an amount of data packets starting with a corrupted data packet, the amount of data packets being equal to ceil(ID*physical layer data bit rate/DPL) with DPL being the packet length of said data packets.

2. The device according to claim 1, wherein said retransmission device is a data packet retransmission device comprising:
a memory configured to store recently transmitted data packets; and
a transmitter configured to receive a retransmission request for the corrupted data packet.

3. The device according to claim 1, wherein said device is a forward error correction device.

4. The device according to claim 3, wherein said forward error correction device is configured according to physical layer inter-arrival time statistics for impulse noise measured on said communication line.

5. The device according to claim 3, wherein said forward error correction device is configured according to ceil(physical layer interleaving delay*physical layer data bit rate/DPL), with DPL being the packet length of said data packets.

6. The device according to claim 1, wherein said device is integrated in a chip.

7. The device according to claim 1, wherein said device is integrated in a server.

8. The device according to claim 1, wherein said device is implemented on a linecard.

9. A physical layer agent integrated in a device that implements physical layer functions for data packet transfer over a communication line,
wherein said physical layer agent is configured to interface with and to share physical layer characteristics with the device as defined in claim 1.

10. A method for mitigating effects of impulse noise on data packet transfer over a communication line, comprising:
transmitting, by a data packet retransmission device, an amount of data packets starting with a corrupted data packet, the amount of data packets being equal to ceil (ID*physical layer bit rate/DPL), the ID being a physical layer interleaving delay ID of said communication line, the physical layer data bit rate being one physical layer interleaving characteristic of said communication line, the DPL being the packet length of said data packets.

11. The method according to claim 10, wherein the ID is an additional physical layer interleaving characteristic of said communication line.

12. A retransmission device for mitigating effects of impulse noise on data packet transfer over a communication line comprising:
a memory configured to store recently transmitted data packets, and
a transmitter configured to,
receive a retransmission request for a corrupted data packet, and
in response to the retransmission request, retransmit a number of data packets starting with said corrupted data packet, said number of data packets being dependent on at least one of a physical layer interleaving delay ID of said communication line and a physical layer data rate of said communication line, the physical layer interleaving delay ID and the physical layer data rate being determined based on a configuration of the physical layer.

13. The device of claim 12, wherein said number of data packets is equal to ceil(ID*physical layer data bit rate/DPL) with DPL being the packet length of said data packets.

14. The device according to claim 12, wherein said device is a forward error correction device.

15. The device according to claim 14, wherein said forward error correction device is configured according to physical layer inter-arrival time statistics for impulse noise measured on said communication line.

16. The device according to claim 14, wherein said forward error correction device is configured according to ceil(physical layer interleaving delay*physical layer data bit rate/DPL), with DPL being the packet length of said data packets.

17. The device according to claim 12, wherein said device is integrated in a server.

* * * * *